(12) United States Patent
Weidmann et al.

(10) Patent No.: US 9,040,142 B2
(45) Date of Patent: May 26, 2015

(54) COMPOSITE ARTICLE COMPRISING PARTICLES AND A METHOD OF FORMING A COMPOSITE ARTICLE

(75) Inventors: Björn Weidmann, Borensberg (SE); Mikael Petersson, Linköping (SE); Per Hallander, Linköping (SE); Pontus Nordin, Linköping (SE); Tommy Grankäll, Borensberg (SE)

(73) Assignee: SAAB AB, Linköping (SE)

( * ) Notice: Subject to any disclaimer, the term of this patent is extended or adjusted under 35 U.S.C. 154(b) by 60 days.

(21) Appl. No.: 13/697,593

(22) PCT Filed: May 11, 2010

(86) PCT No.: PCT/SE2010/050518
§ 371 (c)(1),
(2), (4) Date: Jan. 31, 2013

(87) PCT Pub. No.: WO2011/142699
PCT Pub. Date: Nov. 17, 2011

(65) Prior Publication Data
US 2013/0129968 A1    May 23, 2013

(51) Int. Cl.
*B32B 5/12* (2006.01)
*B29C 70/02* (2006.01)
(Continued)

(52) U.S. Cl.
CPC .............. *B32B 5/12* (2013.01); *Y02T 50/433* (2013.01); *B29C 70/025* (2013.01); *B29C 70/202* (2013.01); *B29C 70/342* (2013.01); *B29K 2105/243* (2013.01)

(58) Field of Classification Search
CPC ....... F41H 5/0471; B32B 5/12; B29C 70/202; B29C 70/342; B29C 70/025
USPC .......................................................... 428/113
See application file for complete search history.

(56) References Cited

U.S. PATENT DOCUMENTS

| 5,129,813 A | 7/1992 | Shepherd |
| 5,984,511 A | 11/1999 | Vasey-Glandon et al. |

(Continued)

FOREIGN PATENT DOCUMENTS

| EP | 1775106 A1 | 4/2007 |
| EP | 1625436 A1 | 5/2008 |

(Continued)

OTHER PUBLICATIONS

PCT/ISA/210—International Search Report—Jan. 10, 2011 (Issued in PCT/SE2010/050518).

(Continued)

*Primary Examiner* — Aaron Austin
*Assistant Examiner* — Jasper Saberi
(74) *Attorney, Agent, or Firm* — Venable LLP; Eric J. Franklin (57) ABSTRACT

A composite article having a longitudinal direction and a transversal direction. The article includes a stack of plies wherein one ply is a bottom ply and one ply is a top ply. Most or all of the plies include fibers. A plurality of plies have fibers substantially in an orthogonal direction and substantially in a same direction as the longitudinally direction of the article. The bottom ply and the top ply have fibers in a substantially orthogonal direction to the longitudinal direction of the article. At least one ply has the fibers substantially in the same direction as the longitudinal direction of the article. At least one of the plies having fibers substantially in the longitudinal direction includes particles selected from the group of thermoplastic tougheners, nano particles, micro particles, elastic particles, elastomer particles and polymer particles or a combination. Also a method of forming an article on a tool.

15 Claims, 6 Drawing Sheets

(51) Int. Cl.
*B29C 70/20* (2006.01)
*B29C 70/34* (2006.01)
*B29K 105/24* (2006.01)

(56) References Cited

U.S. PATENT DOCUMENTS

| | | | |
|---|---|---|---|
| 2004/0115299 A1 | 6/2004 | Potter et al. | |
| 2004/0213952 A1* | 10/2004 | Takemura et al. | 428/105 |
| 2005/0163975 A1 | 7/2005 | Chen et al. | |
| 2007/0128960 A1* | 6/2007 | Ghasemi Nejhad et al. | 442/59 |
| 2007/0175575 A1* | 8/2007 | Rubin et al. | 156/221 |
| 2008/0048359 A1* | 2/2008 | Krogager et al. | 264/241 |
| 2009/0155532 A1* | 6/2009 | Gammon et al. | 428/147 |
| 2010/0233424 A1* | 9/2010 | Dan-Jumbo et al. | 428/113 |

FOREIGN PATENT DOCUMENTS

| | | |
|---|---|---|
| EP | 2047972 A1 | 4/2009 |
| JP | 2009292865 A | 12/2009 |
| WO | WO-2007/038930 A1 | 4/2007 |
| WO | WO-2008/060545 A1 | 5/2008 |
| WO | WO-2009/007617 A2 | 1/2009 |
| WO | WO-2010/056164 A1 | 5/2010 |

OTHER PUBLICATIONS

PCT/ISA/237—Written Opinion of the International Searching Authority—Jan. 10, 2011 (Issued in PCT/SE2010/050518).

PCT/IPEA/409—International Preliminary Report on Patentability—Mar. 23, 2012 (Issued in PCT/SE2010/050518).

M.T. Cann et al.; "Effect of part-tool interaction on cure distortion of flat composite laminates", 49th International SAMPE Symposium, May 6-10, 2001; vol. 46 II, pp. 2264-2277.

P. Hubert et al.; "Aspects of the Compaction of Composite Angle Laminates: An Experimental Investigation", Journal of Composite Materials, 2001, vol. 35, No. 01/2001, pp. 2-26.

R.H. Nelson et al.; "Prediction of dimensional changes in composite laminates during cure"; 34th International SAMPE Symposium, May 8-11, 1989, vol. 34 II, pp. 2397-2410.

J D D Melo et al.; "Modeling manufacturing distortions in flat, symmetric, composite laminates", 31st International SAMPE Technical Conference, Oct. 26-30, 1999, vol. 31, pp. 592-603.

* cited by examiner

COMPOSITE ARTICLE COMPRISING PARTICLES AND A METHOD OF FORMING A COMPOSITE ARTICLE

CROSS-REFERENCE TO RELATED APPLICATIONS

This application is the national phase under 35 U.S.C. §371 of PCT/SE2010/0505 filed 11 May 2010.

TECHNICAL FIELD

The present invention relates to a composite article and a method of forming an article on a tool.

The article is made of resin prepregs or plies, such as thermo setting plastic comprising fibres.

BACKGROUND ART

Composite articles may be produced by mechanical forming or method hot drape forming (HDF). When producing composite articles by hot drape forming, it requires the use of pressure onto stacks of prepregs or plies against a tool. A vacuum bag is used to achieve a pressure such that wrinkles and trapped air in the stack can be forced out under vacuum pressure. The vacuum bag can be used for curing the resin of the plies in an autoclave or in an oven at elevated temperature and pressure. After curing the bag is removed from the forming tool and the article is removed from the tool. By mechanical forming a roll could be used to conform a stack of prepregs or plies against a tool.

When articles are hot drape formed or mechanical formed on a tool, which has one substantially longitudinal direction and one substantially transversal direction, wrinkles are easily formed if the tool has some small curvature, bevels, any protrusion or any depression formed in the tool. It is thus desirable that formation of wrinkles at the location of bevels or other projections or depressions of the article is eliminated in the stack during the forming process.

The tool may have a pad-up area, or a depressed area in the tool. The purpose of the depressed area or the pad-up area is to make a thickening of the article. The thickening is a reinforcement in the article. It is difficult to form articles without wrinkles on a tool which has pad-up areas or depressed areas.

U.S. 2004/0115299 discloses a method where the vacuum bag is made thinner within the area of a forming surface, which more readily stretches and conforms the stack to the forming surface.

U.S Pat. No. 5,129,813 describes an evacuation process which reduces the tendency of the vacuum bag to trap air. The method provides a vacuum bag having a plurality of interconnected channels.

U.S. 2005/0163975 A1 and U.S. Pat. No. 5,984,511 relates to stacking sequences when forming articles having an uneven surface, but does not relate to the problem of wrinkles in the article.

EP 1775106 describes forming articles on tools, which may have a curvature, which relates to the orienting of fibre directions of the prepregs in the fibres stack so that none of the fibre directions of the prepregs occur parallel with a curve of the moulding tool. The downforming may then be carried out in a simpler manner.

The applicant has found a method in which it is possible to hot drape form an article on a tool without creating wrinkles in the article. This is disclosed in PCT/SE2008/051304 (not yet published) which relates to a method in which a certain stacking sequence is used for avoiding wrinkling when forming an article by hot drape forming. Plies having fibres in the longitudinal direction of the tool, plies having fibres in the orthogonal direction of the tool and fibres having a diagonal direction of the tool are arranged in a specific order in the stack in order to avoid wrinkles. The inventors of the present invention have now evaluated the stacking method disclosed in PCT/SE2008/051304. In some cases, there might be some problems during the forming in which the article becomes thinner in certain parts. The article can for example be thinner in curved parts. The present invention is thus an evaluation of the stacking method above and the present invention leads for example to fewer mistakes during production of composite articles.

SUMMARY OF THE INVENTION

The present invention relates to a composite article, wherein the article has a longitudinal direction and a transversal direction, the article comprises a stack of plies wherein one ply is a bottom ply and one ply is a top ply, most of or all of the plies comprise fibres, and the article comprises a plurality of plies having fibres substantially in the orthogonal direction and substantially in the same direction as the longitudinally direction of the article, wherein the bottom ply and the top ply have fibres in a substantially orthogonal direction to the longitudinal direction of the article, at least one ply has the fibres substantially in the same direction as the longitudinal direction of the article, wherein at least one of the ply/plies having fibres substantially in the longitudinal direction comprise/s particles selected from the group of thermoplastic tougheners, nano particles, micro particles, elastic particles, elastomer particles and polymer particles or a combination of them.

Further, the present invention relates to a method of forming an article on a tool, the tool having one longitudinal direction and one transversal direction, wherein the method comprises the steps of:

arranging a stack of plies wherein most of or all of the plies comprise fibres, wherein the stack comprises a plurality of plies having fibres substantially in the orthogonal direction to and substantially in the same direction as the longitudinally direction of the tool, so that when positioned on the tool the ply arranged closest to the tool and the ply arranged furthest away from the tool have the fibres substantially orthogonal to the longitudinal direction of the tool, and arranging at least one ply having the fibres substantially in the same direction as the longitudinal direction of the tool between plies having fibres substantially orthogonal to the longitudinal direction of the tool, and wherein at least one of the ply/plies having fibres substantially in the longitudinal direction of the tool comprise/s particles selected from the group of thermoplastic tougheners, nano particles, micro particles, elastic particles, elastomer particles and polymer particles or a combination of them.

The method further comprises conforming the stack to the tool with a forming medium, and removing the article from the tool.

The article to be produced can be a beam for an air craft.

BRIEF DESCRIPTION OF THE DRAWINGS

The present invention will now be described by way of example with reference to the accompanying schematic drawings, of which.

DEFINITIONS

When referring to the direction of fibres in the plies, it is referred to the direction of the fibres in an angle to the longitudinal direction of the article or of the tool if nothing else is stated. The stack is transferred to the tool in such a way that the fibres are arranged in different ways on the tool as defined in the claims.

Figure 1:
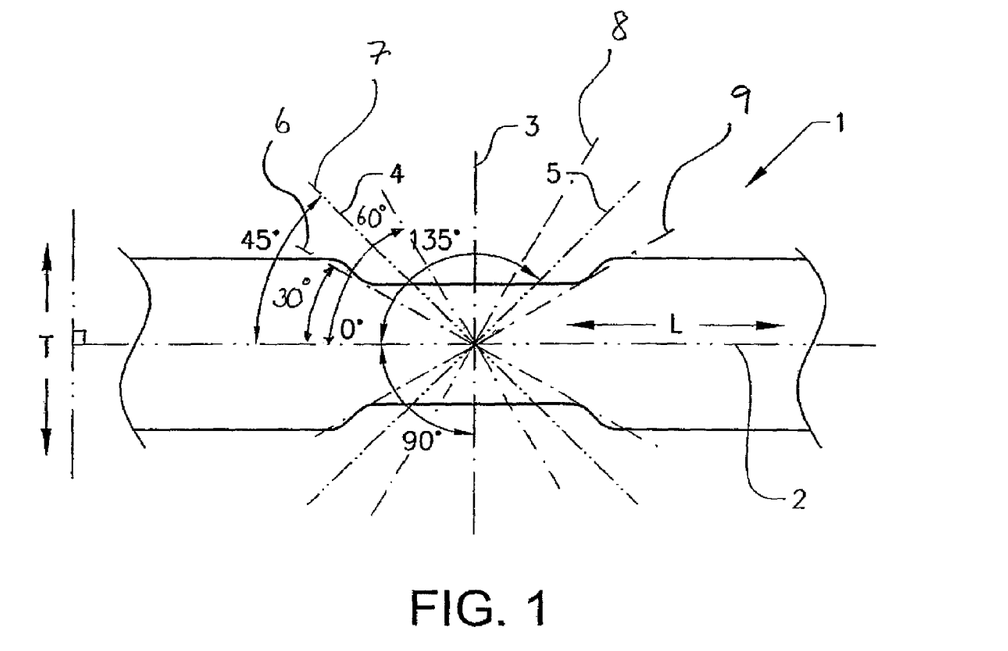
FIG. 1 shows a tool according to the present invention, in a view from above, in which different fibre directions of plies are disclosed.

In FIG. 1, a tool 1 is shown in a view from above. The tool has a longitudinal direction L and a transversal direction T. Different directions of fibres are also shown in the Figure. A ply having the fibres in the same direction 2 as the longitudinal direction L of the tool 1 is also defined to have the fibres in an angle of 0° to the longitudinal direction L of the tool 1. A ply having the fibres orthogonal 3 to the direction of the tool is also defined to have the fibres in an angle of 90° to the longitudinal direction L of the tool 1. Further, the fibre direction diagonal to the longitudinal direction L are such fibres that have the angle of 30° 6 to 60° 7 and 120° 8 to 150° 9 to the longitudinal direction L of the tool 1, or to the article, shown in FIG. 8. Diagonal fibres may thus have the angle 45° or 135°, shown as 4 and 5 in the FIG. 1, to the longitudinal direction L. However, the diagonal direction is extending from the angle 30° to 60° and from 120° to 150°, which is shown as 6, 7, 8 and 9 in FIGS. 1 and 815, 816, 817 and 818 in FIG. 8. The same applies when referring to an article.

DETAILED DESCRIPTION

Figure 8:
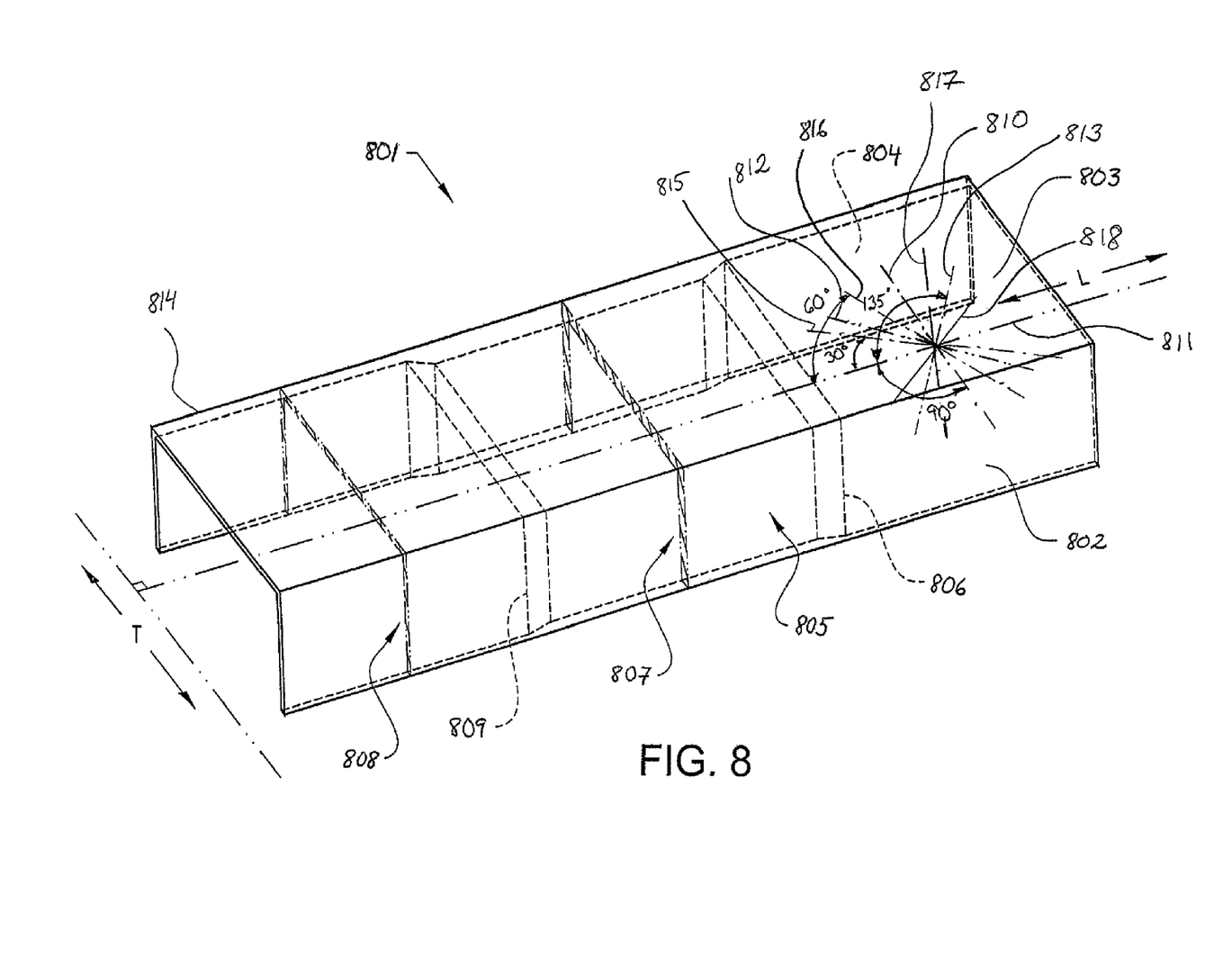
FIG. 8 shows an article according to the present invention.

The present invention thus relates to a composite article, shown in FIG. 8, wherein the article has a longitudinal direction L and a transversal direction T, the article 801 comprises a stack of plies wherein one ply is a bottom ply and one ply is a top ply, most of or all of the plies comprise fibres, and the article comprises a plurality of plies having fibres substantially in the orthogonal direction 810 and substantially in the same direction 811 as the longitudinally direction L of the article 801, and wherein the bottom ply and the top ply have fibres in a substantially orthogonal direction 810 to the longitudinal direction L of the article 801, at least one ply has the fibres substantially in the same direction 811 as the longitudinal direction L of the article 801, wherein at least one of the ply/plies having fibres substantially in the longitudinal direction L comprise/s particles selected from the group of thermoplastic tougheners, nano particles, micro particles, elastic particles, elastomer particles and polymer particles or a combination of them. Such an article has the advantages that no wrinkles are formed in the article and the thickness of thinning of the article is avoided. The particles have increased the friction between the fibres in the ply in which the particles are comprised, preventing the fibres from sliding away from each other during the production method. Thus, the thinning of the ply is prevented during production of the article when the ply comprises particles and fewer articles with defects are made.

It is defined that most of or all of the plies comprise fibres. For example a ply comprising resin or polymer material but no fibres could be arranged between plies comprising fibres. However, this will only concern a few plies, if any. Further, it is defined that at least one of the plies having fibres in the longitudinal direction comprises particles. A certain case could be that all the plies having fibres in the longitudinal direction comprise particles.

In addition, the present invention relates to a composite article, wherein it further comprises at least one ply having fibres substantially diagonal 812, 813, 815, 816, 817, 818 to the longitudinal direction L of the article 801, wherein such ply or plies are arranged next to each other or between plies having fibres substantially orthogonal 810 to the longitudinal direction L of the article 801, wherein at least one of the ply/plies having the fibres substantially diagonal 812, 813, 815, 816, 817, 818 to the longitudinal direction L of the article comprises particles. The particles have improved the possibility of the plies having fibres in the diagonal direction to the longitudinal direction L to keep the fibres in place, in order to prevent thinning of the article. When the article contains plies having fibres substantially diagonal 812, 813, 815, 816, 817, 818 to the longitudinal direction L of the article, its mechanical properties are improved. Further, the thinning of the article is avoided, which also improves the mechanical strength of the article, and the particles may also give additional strength to the article. Besides, the article is not wrinkled.

It is defined that at least one of the plies having fibres in the diagonal direction comprises particles. All plies having fibres in the diagonal direction may also comprise particles.

Once again, it is pointed out that the composite article may comprise at least one ply/plies having fibres in the angle of 30° 815 to 60° 816 and 120° 817 to 150° 818 to the longitudinal direction L of the article. Those plies are defined to be diagonal to the longitudinal direction L of the article. Such plies are arranged next to each other or between plies having the fibres substantially in the orthogonal direction.

The present invention further relates to an article wherein the ply/plies having the fibres substantially in the orthogonal direction do/does not comprise particles. When the article is produced, an advantageous gliding effect is kept in the ply/plies having fibres in the orthogonal direction is thus kept, which avoids wrinkles in the article.

The present invention also relates to a composite article, wherein the article includes a thicker region or a build-up area or 805, wherein the article comprises at least one ply which covers only the area of the thicker region or the build-up area. Sometimes this area is also called a pad-up area. The term pad-up area is however also used for the area of a tool, on which the thicker region or build-up area is made on. This is referred to further below. The terms "thicker region" or "build-up area" 805 are used for a thicker area of the article, which can be seen in FIG. 8. Further down, it is described how such an area is built up by the method. A thicker area or a build-up area 805 is used in order to strengthen the article in the area. It could for example be used for the positioning of fastening elements, which might require a stronger part of an article. The advantage of the particles preventing sliding of fibres and the stacking sequence which prevents wrinkling is especially seen in the area of a thicker region or a build-up area, where those problems may arise.

Figure 9:
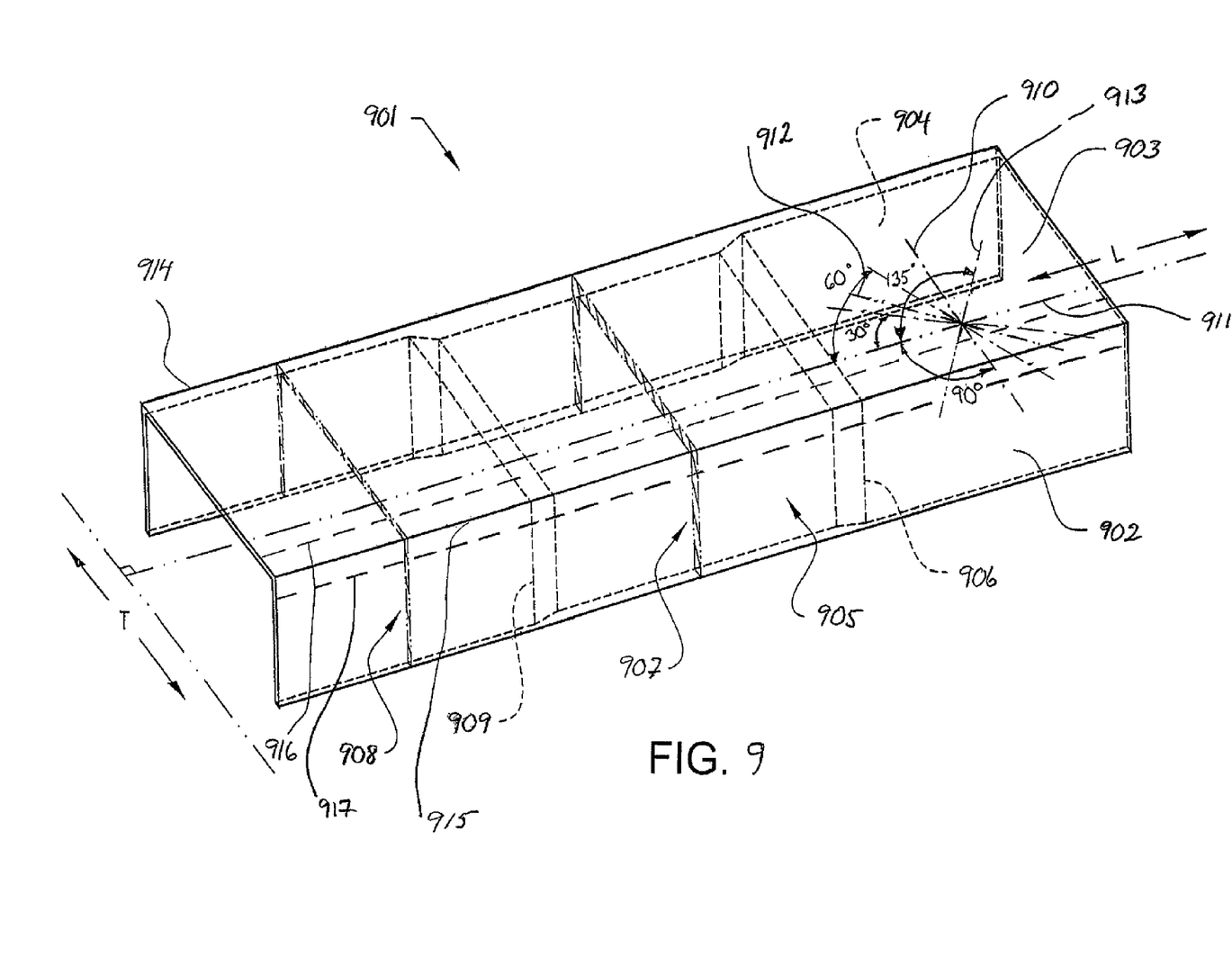
FIG. 9 shows an article according to the present invention wherein a region comprising particles is shown.

The present invention also relates to a composite article, wherein the article includes at least one curved part 814. The particles may be placed in the region of the curved part 814. A curved part could be a radius or a corner as is disclosed in FIG. 8. In FIG. 9, is an article corresponding to the article in FIG. 8 disclosed. The reference numbers 901 to 914 in FIG. 9 correspond to reference numbers 801 to 814 in FIG. 8. All diagonal directions shown in FIG. 8 are not shown in FIG. 9. In FIG. 9 is an area of a curved part 915 shown. The area is between the two dotted lines 916 and 917. This area is the area of a curved part. Of course the size of the area differs from case to case. This is only an example of an area which may comprise particles according to the present invention. The curvature in FIGS. 8 and 9 are in the transversal direction. However, the curvature may also be comprised in the longitudinal direction. A curvature may for example be formed at a transition area 39, 55, which can be seen in FIGS. 3 and 5.

Figure 10A:
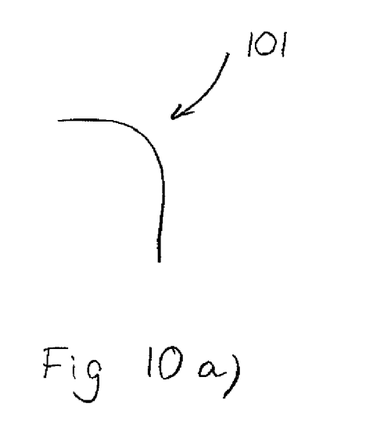
FIGS. 10a) to 10d) shows different examples of curved parts according to the present invention.
Figure 10B:
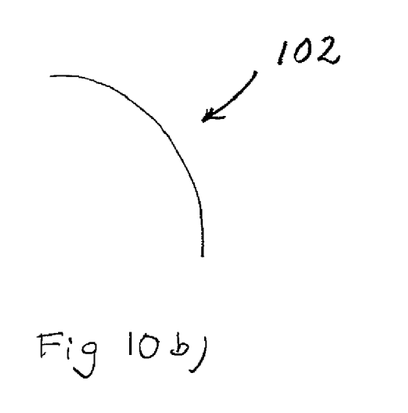
Figure 10C:
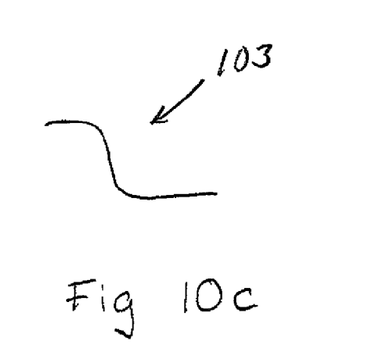
Figure 10D:
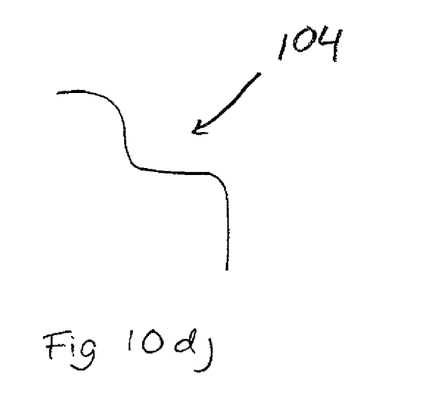

A corner is here an example of a curved part. However, any other curve form could be used. An example of a curved form is a radius. A further example is as shown above, a corner. If the corner is rounded it also may comprise a radius. Further, several curved parts could be used, or a double curved part. Even if a corner is shown in FIG. 8, several more rounded forms are included in the present invention. The ply or plies are formed down from one surface to another surface in the area around the curved part. Some curved parts in the cross-section are shown in FIGS. 10*a*) to 10*d*). In FIGS. 10*a*) and 10*b*) are two different radii 101 and 102 shown, In FIG. 10*c*) is a double curved part 103 shown, as well as another kind of double curved part 104 is shown in FIG. 10*d*). Several more different kind of curved parts are embraced according to the present invention. FIGS. 10*a*) to 10*d*) only show some examples. As stated above, the curvature may also be comprised in the longitudinal direction. The advantageous effect achieved with the stacking sequence and the particles in the plies have a special good effect in curved parts, since the problem with wrinkling and fibre sliding especially accrues in curved parts. The effect of placing particles in the region of the curved part is especially good, since the thinning of the article may be larger in such an area and it may be a region in which a reinforcement may be needed.

Further, the particles do not need to be placed only in the region of the curved part, but could be arranged in substantially the whole ply. The particles may be placed in the region desired in every specific case. The particles also have the effect that it strengthens the article in the area of the placement. This is especially good in curved parts of the article.

The present invention also relates to a composite article, wherein it comprises a stack, wherein the bottom ply has the fibres substantially orthogonal 810 to the longitudinal direction L of the article 801, the next four plies have the fibres substantially diagonal 812, 813, 815, 816, 817, 818 to the longitudinal direction L of the article 801, the next ply has the fibres substantially orthogonal 810 to the longitudinal direction L of the article 801, the next four plies have the fibres in substantially the same direction as the longitudinal direction L of the article 801, the next ply has the fibres substantially orthogonal 810 to the longitudinal direction L of the article 801, the four next plies have the fibres diagonal 812, 813, 815, 816, 817, 818 to the longitudinal direction L of the article 81, the next ply has the fibres substantially orthogonal 810 to the longitudinal direction L of the article 81. Such a stacking sequence is especially good for composite articles, which will have no wrinkles and the fibres will be placed even throughout the article, also in any curved areas or thicker areas.

Further, the article may comprise a stack wherein the bottom ply has the fibres substantially orthogonal 810 to the longitudinal direction L of the article 801, the next two plies have the fibres substantially diagonal to the longitudinal direction L of the article 810, the next two plies have the fibres substantially diagonal to the longitudinal direction L, the next ply has the fibres substantially orthogonal 810 to the longitudinal direction L of the article 801, the next four plies have the fibres in substantially the same direction as the longitudinal direction L of the article 801, the next ply has the fibres substantially orthogonal 810 to the longitudinal direction L of the article 801, the two next plies have the fibres substantially diagonal to the longitudinal direction L of the article 801, the two next plies have the fibres substantially diagonal to the longitudinal direction L, the next ply has the fibres substantially orthogonal 810 to the longitudinal direction L of the article 801. The stack sequence could be 90°/45°/45°/135°/135°/90°/0°/0°/0°/0°/90°/135°/135°/45°/45°/90°.

The arrangement of the fibres in the order as disclosed above, gives very good mechanical properties. It is beneficial to have the same number of plies for every direction of the fibres. That means that it is an advantage to have in one article, for example four plies having orthogonal 3 fibres, four plies having fibres in the longitudinal direction L, four fibres having diagonal direction and four fibres having diagonal direction orthogonal to the first diagonal direction (for example 45° and 135°).

In order to get a simple quasi isotropic lay-up, the directions 0°, 90°, 45° and 135° are all used. The plies having fibres in different directions should be used in the same number, i.e. for example four 0° plies, four 90° plies, four 45° plies and four 135° plies. However, different lay-ups can also be used, and it depends on how the article will be used and the properties which are needed in the article. The 0° plies give the article rigidity and those plies can be arranged in about the middle of the stack. The 45° and 135° could be exchanged with other diagonal angles according to the definition. The angles could for example be 30° and 150° or 60° and 120°.

The article may be a beam for use in an aeroplane and must be very strong and stacks having plies with fibres in several directions are necessary. The lay-up of 90, 45, 45, 135, 135, 90, 0, 0, 0, 0, 90, 135, 135, 45, 45, 90 is a good lay-up, which will give a producible beam. The addition of particles in the 0, 45, 135 plies gives an effective article, in which the article is strong, which is a result of the stacking, the addition of particles, and in that the fibres in the 0, 45, 135 plies are kept on the right places and not moved by undesired gliding.

Examples of tougheners used in the plies are polyamide and other thermoplastic tougheners or thermoplastic elastomers. Tougheners may have the average size of 0.2 to 40 µm, or typically 15-30 µm. The elastic particles, elastomer particles or the polymer particles may have the average size of 0.2 to 40 µm, or typically 15-30 µm.

Further, the nano particles may be selected from the group of nano tubes, nano double wall tubes, nano multi wall tubes, nano fibres, nano double wall fibres, nano filaments, nano double wall filaments and nano wires or a combination thereof and the micro particles may be selected from the group of micro tubes, micro double wall tubes, micro multi wall tubes, micro fibres, micro double wall fibres, micro filaments, micro double wall filaments and micro wires or a combination thereof. Those nano particles and micro particles may give better electrical properties, properties of conduction of heat, mechanical properties and improved inter laminar strength. Besides, those particles have the improved effect regarding the increased friction between the fibres, which leads to the improved properties such as avoided thinning of the article, for example radius thinning. The nano or micro tubes, double wall tubes, multi wall tubes, fibres, double wall fibres, filaments, double wall filaments or wires may be oriented in some direction or they may be random oriented.

Further, according to the present invention, the nano or micro particles can be made of carbon, metal, ceramic material, organic material, or glass. The nano particles may thus be chosen from carbon nano tubes, carbon nano wires, carbon nano filaments and carbon nano fibres. Further, the carbon nano tubes may be in the shape of forest mats of aligned carbon nano tubes.

Examples of nano particles or micro particles are nano or micro silica particles, nano or micro ceramic particles, nano or micro particles of silica compounds, silicon compounds, graphene, and exfoliated clays.

If nano particles extended in the length are used they have a length of 0,125 mm or less. This is suitable for a common pre-preg ply having a thickness of 0,125 mm used in the production of aircrafts. If leaning, or in the plane oriented nano particles are used, the length preferably can be longer. The definition of nano means that a particle has at least one dimension not more than 200 nm. 1 nm (nanometre) is defined as $10^{-9}$ metre (0,000 000 001 meter). Typically the diameter of a multiwall nano tube is 5-35 nm. Typically the diameter of a single wall nano tube is 1,2-1,7 nm, typically 1,35-1,45 nm.

The nano and micro particles may also be for example spherical. The nano particles have the average diameter between 1 and 200 nm and the micro particles have the average diameter between 0.2 µm and 40 µm.

The degree of impregnation may also be used for increasing the friction in a prepreg layer.

Particles may also be used in the orthogonal plies. In such cases, the impregnation degree and the thickness of the ply must be estimated in order to allow an intra ply and/or inter ply sliding in those plies.

The content of the particles can in the normal case be about 1 volume %. The content is a local content, i.e. the content refers to the area of the ply in which the particles are comprised. If the particles are comprised in a curved part for example, the content of particles is calculated on the area of the ply in which the particles are comprised. Further, if the particles are arranged in the whole ply, the content of the particles are calculated on the whole ply. 0.1 to 1 volume % of particles could be considered as a lower limit for the content of particles. The ply may thus comprise particles in the amount of from 0.1 volume % in the area of the ply comprising particles. There is no upper limit for the amount of particles, regarding the function as enhancing the friction of the fibres in the ply. However, there may be other limiting factors for the amount of particles.

Figure 2:
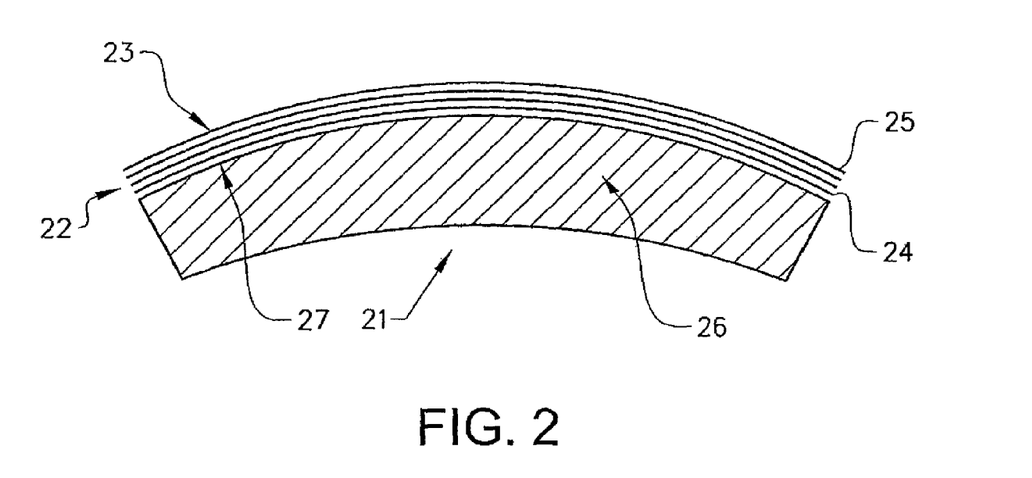
FIG. 2 shows a cross-section in the longitudinal direction of a tool with a stack of plies according to the present invention.

The present invention also relates to a method of forming an article on a tool, which can be seen in FIG. 2. A cross-section view in the longitudinal direction of the tool 21 is shown. When referring to the fibre directions reference is also made to FIG. 1. The tool 1, 21 has one longitudinal direction L and one transversal direction T, wherein the method comprises the steps of:

arranging a stack 22 of plies 23, wherein most of or all of the plies comprise fibres, wherein the stack comprises a plurality of plies having fibres substantially in the orthogonal direction 3 to and substantially in the same direction 2 as the longitudinally direction L of the tool 21, so that when positioned on the tool 21 the ply 24 arranged closest to the tool 21 and the ply 25 arranged furthest away from the tool 21 have the fibres substantially orthogonal 3 to the longitudinal direction L of the tool, and arranging at least one ply having the fibres substantially in the same direction 2 as the longitudinal direction L of the tool 1, 21 between the plies having fibres substantially orthogonal 3 to the longitudinal direction L of the tool 21, and wherein at least one of the ply/plies having fibres substantially in the longitudinal direction L of the tool 21 comprise/s particles selected from the group of thermoplastic tougheners, nano particles, micro particles, elastic particles, elastomer particles and polymer particles or a combination of them, and conforming the stack to the tool with a forming medium; and removing the article from the tool 61, 71.

The fibre reinforced polymer plies have unidirectional fibres in the plies.

It is defined that most of or all of the plies comprise fibres. For example a ply comprising resin or polymer material but no fibres could be arranged between plies comprising fibres. Further, it is defined that at least one of the plies having fibres in the longitudinal direction comprises particles. A certain case could be that all the plies having fibres in the longitudinal direction comprise particles.

The ply/plies having the fibres substantially in the orthogonal direction may not comprise particles. When the article is produced, an advantageous gliding effect is kept in the ply/plies having fibres in the orthogonal direction is thus kept if no particles are added to such piles, which avoids wrinkles in the article. Thus, in some cases, the ply/plies having the fibres substantially in the orthogonal direction does not comprise particles.

Figure 6:
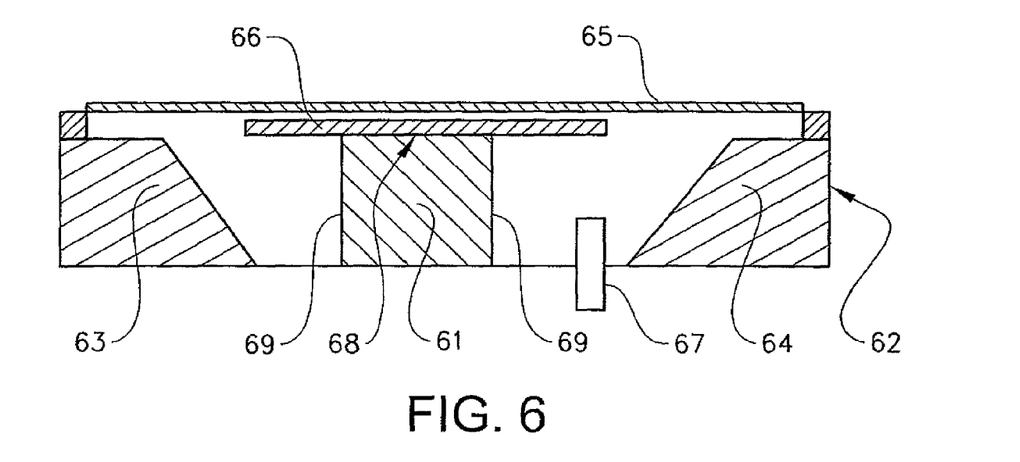
FIG. 6 shows a cross-section in the transversal direction of a tool according to the present invention, a stack of plies on the tool and a forming medium in an apparatus for forming the stack.
Figure 7:
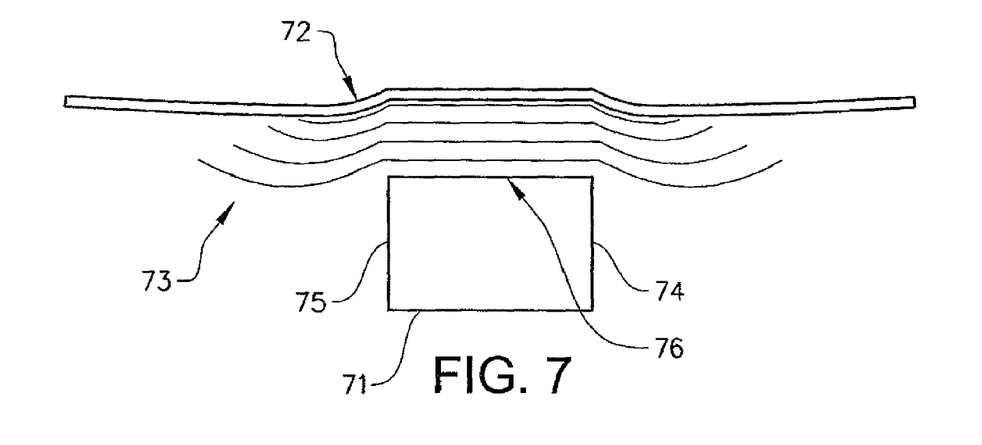
FIG. 7 shows a cross-section in the transversal direction of a tool according to the present invention, a stack of plies on the tool and a forming medium.

An apparatus for forming an article by conforming a stack according to the present invention is disclosed in FIG. 6 and in FIG. 7. A tool 61, 71 is disclosed with a stack 66, 73 and a forming medium 65, 72.

The stack may be arranged on a temporary support (not shown), where after the stack is transferred to the tool. The temporary support could be a plane and vertical support. The support could however have other forms. When referring to the directions of the fibres in the different plies, the direction always refer to the direction of the tool, to which the stack is transferred to when it refers to the method. Several prepregs or tapes may first be laid in the form of a stack. This is done by hand or by an Automatic Tape Laying Machine on a temporary support. This is followed by for example a Hot drape forming, HDF, process. The stack is transferred to the tool 61, 71 in a HDF apparatus 62 and then the stack may be heated up followed by conforming the stack 66, 73 with a forming medium 65, 72, which could be a vacuum bag made of an elastic bag material.

The article to be formed could for example be a beam. It can be seen in FIGS. 6 and 7 that the prepreg stack 66, 73 extends outside the top surface 68, 76 of the tool. When hot drape forming is performed, the outer parts of the stack will be forced down to the side edges 69, 74, 75 of the tool 61, 71 by a forming medium in the form of a vacuum bag and there form flanges in the article. The stack may also be forced down by mechanical means, such as rolls, when forming flanges in the article. Examples of flanges 82, 84 in an article 81 are shown in FIG. 8.

For easiness, the fibre direction of the plies will sometimes shortly be called orthogonal direction and the longitudinal direction, respectively. The direction is related to the tool or the article, depending on what is concerned in the circumstances.

For further simplifying the expressions, the plies having the fibres substantially orthogonal to the longitudinal direction of the tool or the article are sometimes called 90° plies, relating to the angle 90°. In the same way, the plies having the fibres substantially in the same direction as the longitudinal direction is called 0° plies, while the plies having the fibres substantially diagonal to the longitudinal direction of the tool or the article are called 45° and 135° plies or any other angle which is defined to be included in the diagonal direction, as defined to be 30° to 60° and 120° to 150°.

When forming a stack 22 of plies on a tool 21, the force from the forming medium will generate shearing forces onto the stack 22 of plies. There will also be shearing forces between the plies. When plies having a substantially orthogonal direction 3 to the longitudinal direction L of the tool is arranged closest to the tool 1, 21, and closest to the forming medium, the shearing forces between the plies and the tool and the forming medium, respectively, decrease. This means that the plies will slide on the tool and against the forming medium. This leads to a decrease in the risk of obtaining wrinkles in the article. Further, when plies having fibres substantially in the same direction 2 as the longitudinal direction L of the tool are situated between plies having fibres substantially in an orthogonal 3 direction to the longitudinal direction L of the tool 1, 21, the plies having fibres in the same direction 2 as the longitudinal L direction will slide together with the plies having orthogonal 3 fibres. This also avoids wrinkles in the article. If wrinkles are formed in hot drape formed articles, the wrinkles are usually formed in the flanges 802, 804 of the articles. The flanges are the parts which are formed on the longitudinal sides of the tool. One longitudinal side 26 of the tool 21 can be seen in FIG. 2 and longitudinal sides 69, 74, 75 are shown in FIGS. 6 and 7. When the stacks are conformed over the corners 27, 38 (FIGS. 2 and 3) of the tool 21, 31, the wrinkles may be formed on the longitudinal sides 26, 37, close to the corners when prior art methods are used. The wrinkles are probably formed due to that the plies do not slide easily between each other, but are locked in positions forming wrinkles. The problems discussed with the wrinkles are the same for hot drape forming and mechanical forming. Besides, in the area of the corners, there might be a sliding effect in specific plies, the plies having fibres in the longitudinal direction L of the tool and the plies having fibres in the diagonal direction 4, 5 of the tool.

It has been found that plies having fibres in substantially orthogonal direction 3 have the property of being able to slide compared to the tool 1, 21 and the forming medium. The orthogonal ply slides in the orthogonal direction. Further, it may help other plies having fibres in other directions to slide between the plies having orthogonal 3 fibres, which will avoid wrinkling of the article to be formed. The sliding in the orthogonal plies occurs due to an "inter ply" movement between the layers or due to a an "intra ply" movement in the layers or by a combination of both. In addition, the ply or plies comprising particles will improve the achieving of an article without any thinning of the article. It has been found that in some cases, the ply/plies having the fibres in the longitudinal direction of the tool or the article are thinned out during the forming of the article. If the ply comprises particles, such a thinning of the article is avoided. It is believed that the particles improve the ability of the fibres in the ply/plies to stay in place and not to move or to rotate, which avoids to make the article thinner in such places. Further, the addition of particles may improve the strength of the article.

The method according to the present invention further comprises arranging at least one ply having fibres substantially diagonal 4, 5 to the longitudinal direction L of the tool 1, 21, wherein such ply or plies are arranged next to each other or between plies having fibres substantially orthogonal 3 to the longitudinal direction L of the tool 1, 21, wherein at least one of the ply/plies having the fibres substantially diagonal 4, 5 to the longitudinal direction L of the tool 21 comprise/s particles. By diagonal direction is meant the direction of 30 to 60° or 120 to 150° to the longitudinal direction L of the tool. The plies having diagonal 4, 5 directions can be situated next to each other. It could be two plies having 45° angle or two plies having 135° angle to the longitudinal direction L of the tool arranged next to each other. Further, a ply having 45° fibres could be situated next to a ply having 135°. In such a sequence, the plies can also be expressed to be lying orthogonal to each other. However, on the outer side of a combination of diagonal plies, plies having orthogonal fibres should be situated. The plies having orthogonal direction will help the diagonal fibres to slide in a suitable way in order to avoid wrinkles, which could otherwise be obtained in the article. Other ply sequences may lock the plies together which may form wrinkles in the article.

The inventors of the present invention have found that there may be a disadvantageous movement or gliding motion of the fibres in the plies having the fibres substantially in the longitudinal direction and the plies having the fibres substantially in the diagonal direction. This can lead to a decrease of fibres in certain areas, such as in curved parts of the tool or curved parts of the article. It will thus lead to a thinning of the article in this area. This movement or sliding motion can be avoided by the addition of the particles. The friction between the fibres is increased, which leads to that the fibres will not move or glide in the same extension when particles are added in the plies having the fibres substantially in the longitudinal direction and the plies having the fibres substantially in the diagonal direction. The sliding effect of the plies having the fibres in the orthogonal direction of the tool is still desired. Therefore, the present invention also relates to a method wherein the plies having the fibres in the orthogonal direction of the tool do/does not comprise articles. The ply or plies having the fibres in the orthogonal direction will then keep the sliding effect for the ply itself and together with other plies as disclosed above. Thus, the friction is increased in the plies having the fibres in the longitudinal and diagonal direction, while the plies having the fibres in the orthogonal direction will have advantageous gliding movements in order to avoid wrinkles in the articles. The friction in the plies discussed above is mainly an intra-ply friction, i.e. a friction in the ply. An inter-ply friction is a friction between plies. The inter-ply friction may be affected by the articles, but it is the intra-ply friction which is utilised in the present invention.

As disclosed above, the particles are used for preventing sliding of the fibres. Such a sliding may occur when fibres in the diagonal plies start to glide instead of rotating. The fibres may then move in relation to each other and they may "climb" onto each other. This movement may cause thinning of the article, which is avoided by the addition of the particles.

Further, the fibres in a ply having the fibres in the longitudinal direction can start to roll if the friction in the ply is overcome by the forming force. This may also lead to a thinning of the article, which is avoided by the addition of particles in the ply/plies.

The combination of the stacking sequence effects, i.e. the avoidance of wrinkling, and the particle effects, i.e. the avoidance of sliding of particles in specific plies, achieves an improved method of producing composite articles and the articles obtained are improved, having no wrinkles and no thinning. The forming force generated by the forming medium can be divided in shear forces which will make the plies slide relatively each other as the forming procedure proceeds. When discussing forming force generated by the forming medium, the forming medium may be a mechanical forming medium or a hot drape forming medium. The sliding has shown to be better between 90° plies, which the method according to the present invention utilizes.

45° and 135° plies are often used in the sequence 45°/45°/135°/135°, or 45°/135° and these plies can create a Pin Jointed Net forming (PJN). When such ply sequences are arranged between 90° plies, the PJN is not locked, which could be the case if arranged between 0° plies. When 45° and 135° plies are locked between for example 0° plies, wrinkles are formed. This is thus avoided with the solution according to the present invention. Further, an improvement is achieved by the addition of particles in the 45°, 135° and the 0° plies, in order to prevent the fibres from moving or sliding in a disadvantageous way in those plies. As disclosed above, other diagonal angles can also be utilised.

It may be possible to use plies having the fibres substantially diagonal 4, 5 to the longitudinal direction L of the tool next to plies having fibres substantially in the same direction 2 as the longitudinal direction L of the tool. However, if such an arrangement is used, those plies should be arranged close to the middle of the stack.

Figure 3:
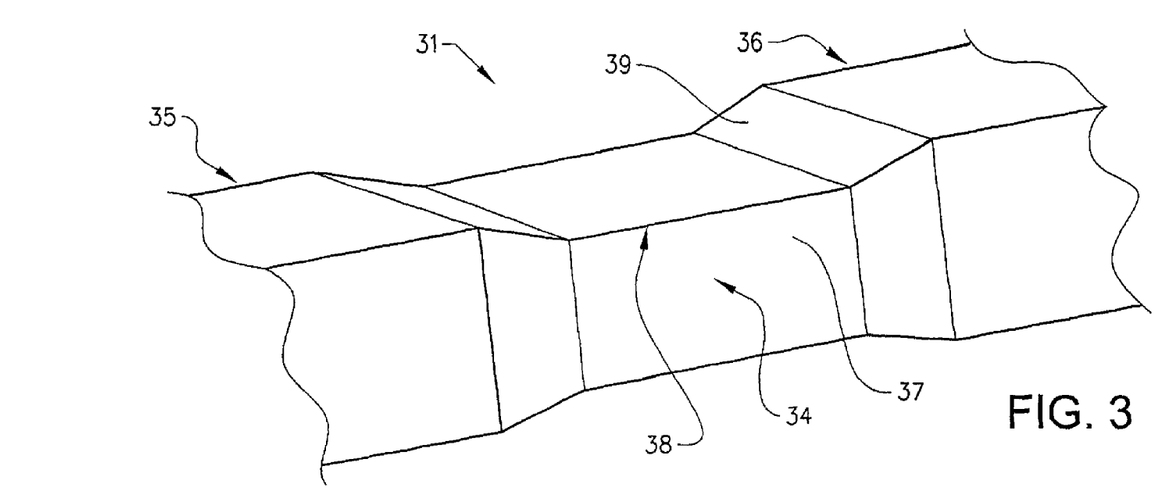
FIG. 3 shows a side view of a part of a tool according to the present invention.
Figure 5:
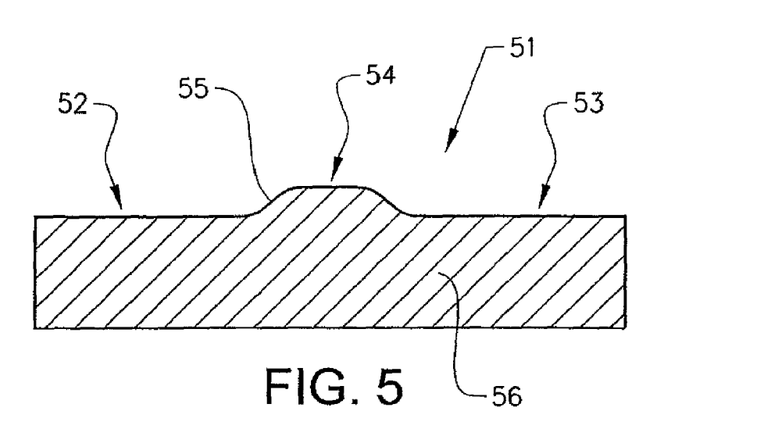
FIG. 5 shows a cross-section in the longitudinal direction of another tool according to the present invention.

Further, the present invention relates to a method, wherein the tool 31, 51 has at least one depressed part 34, 52, 53 and at least one protruding part 35, 36, 54, which protruding part is protruding in relation to the depressed part 34, 52, 53, of the tool 31, 51. The tool 31, 51 has at least one narrower part and at least one thicker part in the cross-section of the tool 31, 51. The depressed areas 34, 52, 53 correspond to the narrower part of the tool 31, 51. The protruding areas 35, 36, 54 correspond to the thicker part of the tool 31, 51.

As discussed above, plies having fibres substantially diagonal 4,5 to the longitudinal direction L of the tool can be arranged next to plies having fibres substantially in the same direction 2 as the longitudinal direction L of the tool. Such plies could be arranged in the depressed part 34, 52, 53 of the tool 31, 51. However, as disclosed above, if such an arrangement is used, those plies should be arranged close to the middle of the stack.

In FIG. 3 there is one depressed part 34 on the tool 31, while there are two depressed parts 52, 53 on the tool 51 shown in FIG. 5. When forming a stack of plies on a tool comprising depressed and protruding parts, there is a transition area 39, 55 between the depressed part 34, 52, 53 and the protruding part 35, 36, 54. This area may form an inclined surface on the tool 31, 51. In the side parts 37, 56 there may be difficulties with wrinkles formed during the forming step. This problem is solved with the present invention by arranging the plies having substantially longitudinal direction L and plies having substantially diagonal direction 4, 5 between plies having orthogonal 3 fibres. The plies with longitudinal fibres L and diagonal fibres 4, 5 will slide between the plies having orthogonal fibres 3, and thereby wrinkles are avoided. The benefit is also obtained by that the plies arranged next to the tool and furthest away from the tool, thus next to the forming medium, are arranged orthogonal to the longitudinal direction L. At least one ply of the plies having the fibres in the longitudinal direction L of the tool and of the plies having the fibres in the diagonal direction of the tool comprises particles. This will improve the method of producing the article, since the fibres in the plies comprising particles will not move or slide as easily as without the particles. This effect is desired in the depressed parts of the tool, since fibres slides more easily in the depressed parts or in the protruding parts of the tool. The particles will increase the friction between the fibres, which makes the fibres stay in their positions. This avoids thinning of the article, which together with the avoidance of wrinkles achieves a good composite article.

Figure 4:
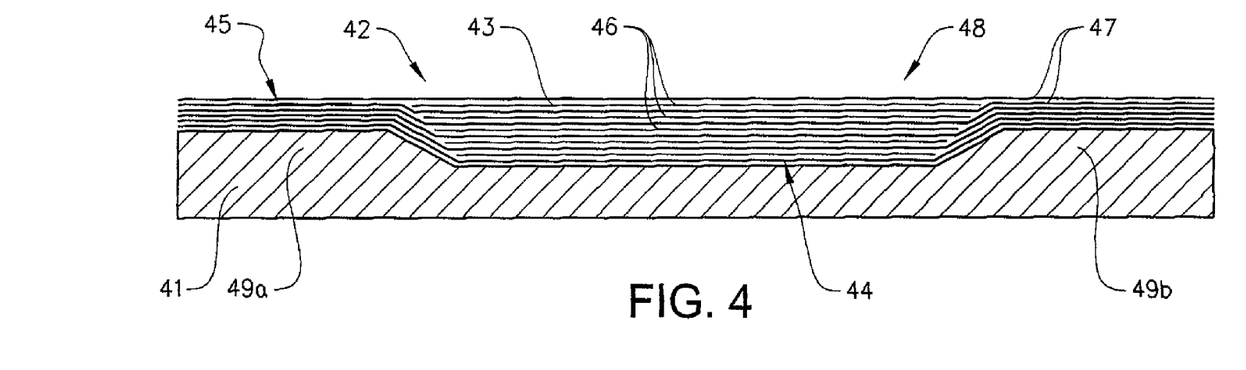
FIG. 4 shows a cross-section of a part of the tool shown in FIG. 3 and a stack of plies on the tool part.

The present invention also relates to a method wherein the plies 42 are arranged so that at least one of the plies 43 covers at least a part of the at least one depressed part 34, 52, 53 and not the at least one protruding part 35, 36, 54 and the other plies 45 cover both the at least one depressed parts 34, 52, 53 and the at least one protruding parts 35, 36, 54. The plies covering the depressed part 34, 52, 53, but not the protruding parts 35, 36, 54, could also be called interleaved plies. When using plies that cover the depressed part 34, 52, 53, but not the protruding part 35, 36, 54, care has to be taken regarding the sequence of plies at both the depressed part 34, 52, 53 and the protruding part 35, 36, 54.

The method also comprises arranging several plies that cover at least a part of the at least one depressed part 34, 52, 53 and not the at least one protruding part 35, 36, 54. When forming articles using such depressed 34, 52, 53 and protruding 35, 36, 54 parts, and covering the depressed parts 34, 52, 53 with plies that do not cover the protruding parts 35, 36, 54, the purpose is to obtain an article which is thickened in the area of the depressed part 34, 52, 53 of the tool. This can be seen in FIG. 4. There are plies 46 which only cover the depressed part, and plies 47 which cover both the depressed part 44 and the protruding part 49a, 49b of the tool 41. This leads to that the article will have a thicker region 48 in the article.

The method further comprises arranging every ply 46 covering at least a part of the at least one depressed part 34, 52, 53 and not the at least one protruding part 35, 36, 54 between two plies 47 covering both the at least one depressed part 34, 52, 53 and the at least one protruding part 35, 36, 54 so that every second ply is a ply covering the at least one depressed part 34, 52, 53 and not the at least one protruding part 35, 36, 54. Sometimes, the area of the depressed part of the tool is called "pad-up" area. The plies 46 covering the depressed part 34, 44 but not the protruding parts 35, 36, 49a, 49b, could be considered to pad up the article in this area. As disclosed above, an area in the article is defined to have a thicker region or a build-up area. This part of the article has been produced in the depressed part or the pad-up area of the tool. Since, the thinning of articles may occur in the curved parts of an article or tool, or in pad-up areas of the tool or in the build-up areas of the article, very good effects are obtained with the particles in the plies according to the present invention.

The plies 46 covering the at least one depressed part 34, 52, 53 and not the at least one protruding part 35, 36, 54 may also be sequenced in any other order, such as two or more such plies together between plies 47 covering both the at least one depressed part 35, 36, 54 and the at least one protruding part 35, 36, 54. The sequence could also be in any other suitable order depending on the desired properties of the article to be formed. The number of plies 46 covering the at least one depressed part 34, 52, 53 and not the at least one protruding part 35, 36, 54 arranged between plies 47 covering both the at least one depressed part 35, 36, 54 and the at least one protruding part 35, 36, 54 could for example vary.

In the field of composite articles, a thicker region 48 of the article has the purpose to form a strengthened region of the article. In such a region, fastening elements could be arranged for example. This makes it possible to have a light article, but still makes it possible to arrange fastening elements in the article. This is a desire in for example the air craft industry.

A depressed part 34 or a pad-up part of the tool 31 is intended for forming a thickened part 48 in the article, which could also be called a build-up part of the article. Such a pad-up area in the tool is also sometimes called a ramp. The ramp is a bevel angle. The ramp can be a 1:xx ramp. The angle of the ramp depends for example on the thickness which is desired in the thickened part of the article. Ramps in the order of 1:10 to 1:200 could be used. A 1:20 ramp is sometimes used when producing composite articles in the air craft industry. The effect of the present invention has shown good effects in avoiding wrinkles when using ramps and the method according to the present invention has been used. Further, very good effects are obtained regarding the prevention of obtaining a thinner part in this area due to sliding of fibres in the plies having the fibres in the longitudinal direction or in the plies having the fibres in the diagonal direction. This is prevented by the addition of the particles in those plies.

An article formed by the method according to the present invention is shown in FIG. 8. The article 801 may be a beam for use in the air craft industry. The article 801 has three sides corresponding approximately to the tool 31 in FIG. 3, when interleaved plies are used for thickening a part of the article. This makes the article to have an even outer surface. The article 801 has three sides 802, 803, 804, which have been conformed to the tool 31 by the method discussed above, and which will be further disclosed below. In the middle of the article is a region 805, between the sloping areas 806, 809, which show the thicker region of the article. The article has an even surface on the side which has not been directed to the tool during forming, but an uneven surface on the side directed to the tool 41, as disclosed in FIG. 4. It can be seen that the article is thicker in one part by the cross section view 807 compared to the cross section view 808 of the thinner part of the article.

A tool 51 having two depressed parts 52, 53 is disclosed in FIG. 5. This could be used when an article need to have a stronger part on each end of the article.

The benefit with the gliding effect from the plies having orthogonal fibres is good when thicker regions, build-up areas, are made in the article. Besides, the particles in the plies having fibres in the longitudinal direction L of the tool and the plies having fibres in the diagonal direction 4, 5 of the tool will prevent the fibres in those plies from sliding in a disadvantageous way. The thickened region is intended for making a build-up stack in the article for making the article stronger in this part. If for example a bolt should be attached to the beam the bolt need to be mounted on a stronger part of a beam. The stronger part is then made by the thickened region 85 in the article 81. The plies which cover at least a part of the depressed area are sometimes also called interleaved plies.

The tools 31, 41, 51 shown in FIGS. 3, 4 and 5 could also be used without using plies which cover at least a part of the depressed part 34, 44, 52, 53 but not the protruding part 35, 36, 49a, 49b, 54. This is also disclosed above. The article obtained does not have a thickened region, but have a substantially even thickness through the article. When producing such articles there are problems with obtaining articles without wrinkles on the side parts of the article close to the transition area 39, 55 between the depressed parts 52, 53, and the protruding parts 35, 54 of the tool. There might also be problems with wrinkles at the sides of the tool 34, 56. Besides, sliding may occur for fibres in plies having fibres in the diagonal direction or plies having fibres in the longitudinal direction, which will make the article thinner in this area of sliding. This is avoided with the method according to the present invention.

The present invention also relates to a method comprising arranging the stack 22, 42 so that when positioned on the tool 21, 41 the ply arranged closest 24, 44 to the tool 21, 41 has the fibres substantially orthogonal 3 to the longitudinal direction L of the tool 21, 41, the next four plies have the fibres substantially diagonal 4, 5 to the longitudinal direction L of the tool 21, 41, the next ply has the fibres substantially orthogonal 3 to the longitudinal direction L of the tool 21, 41, the next four plies have the fibres in substantially the same direction as the longitudinal direction L of the tool 21, 41, the next ply has the fibres substantially orthogonal 3 to the longitudinal direction L of the tool 21, 41, the four next plies have the fibres substantially diagonal 4, 5 to the longitudinal direction L of the tool 21, 41, the next ply has the fibres substantially orthogonal 3 to the longitudinal direction L of the tool 21, 41.

The method according to the present invention also comprises arranging the stack 22, 42 so that when positioned on the tool the ply arranged closest 24, 44 to the tool 21, 41 has the fibres substantially orthogonal 3 to the longitudinal direction L of the tool 21, 41, the next two plies have the fibres substantially diagonal to the longitudinal direction L of the tool, the next two plies have the fibres substantially diagonal to the longitudinal direction L, the next ply has the fibres substantially orthogonal 3 to the longitudinal direction L of the tool 21, 41, the next four plies have the fibres in substantially the same direction as the longitudinal direction L of the tool, the next ply has the fibres substantially orthogonal 3 to the longitudinal direction L of the tool 21, 41, the two next plies have the fibres substantially diagonal to the longitudinal direction L of the tool, the two next plies have the fibres substantially diagonal to the longitudinal direction L, the next ply has the fibres substantially orthogonal 3 to the longitudinal direction L of the tool 21, 41. The stack sequence could be 90°/45°/45°/135°/135°/90°/0°/0°/0°/0°/90°/135°/135°/45°/45°/90°.

The arrangement of the fibres in the order as disclosed above, gives very good mechanical properties. It is beneficial to have the same number of plies for every direction of the fibres. That means that it is an advantage to have in one stack, for example four plies having orthogonal 3 fibres, four plies having fibres in the longitudinal direction L, four fibres having 45° 4 and four fibres having 135° 5.

In order to get a simple quasi isotropic lay-up, the directions 0°, 90°, 45° and 135° are all used. The plies having fibres in different directions should be used in the same number, i.e. for example four 0° plies, four 90° plies, four 45° plies and four 135° plies. However, different lay-ups can also be used, and it depends on how the article will be used and the properties which are needed in the article. The 0° plies give the article rigidity and those plies can be arranged in about the middle of the stack.

A beam for use in an aeroplane must be very strong and stacks having plies with fibres in several directions is necessary. The lay-up of 90, 45, 45, 135, 135, 90, 0, 0, 0, 0, 90, 135, 135, 45, 45, 90 is a good lay-up, which will give a producible beam. The addition of particles in the 0, 45, 135 plies gives an effective article, in which the article is strong, which is a result of the stacking, the addition of particles, and in that the fibres in the 0, 45, 135 plies are kept on the right places and not moved by undesired gliding.

Further, the present invention relates to a method wherein the tool comprises at least one curved part 814, 914, 915. The plies comprising particles may be arranged so that the particles are placed in the area of the curved part 814, 914, 915. However, the particles may also be distributed in the whole ply. A further positive effect which is achieved by the present invention by the addition of particles is that the article is strengthened in the area of the addition of the particles. This is especially good in the curved parts, since those parts may be weak. At least two advantages are achieved. The forming of the article in those areas will be more predictable since wrinkles are avoided and the fibres in the plies will not move or slide in an undesired way. In addition, the article will get stronger in this part due to that the particles are added in this area. A lighter article and with an improved weight efficiency will be achieved and composite articles may be used in products, in which today only metal is used. The ply can be manufactured with particles in a specific area which then can be applied at the correct place during manufacturing of the article in order to place the particles in the curved parts of the article.

The plies comprising particles are made in a suitable way. The particles may be added in the resin films which are applied on both sides of the fibres. The particles may also be added to the fibres before the resin is added to the prepreg.

The nano particles may be selected from the group of nano tubes, nano double wall tubes, nano multi wall tubes, nano fibres, nano double wall fibres, nano filaments, nano double wall filaments and nano wires or a combination thereof and the micro particles may be selected from the group of micro tubes, micro double wall tubes, micro multi wall tubes, micro fibres, micro double wall fibres, micro filaments, micro double wall filaments and micro wires or the a combination thereof.

Further, the nano particles or the micro particles may be made of carbon, metal, ceramic material, organic material, or glass.

The different kind of particles mentioned above regarding the article according to the present invention is also used in the method according to the present invention of producing an article.

The method according to the present invention also comprises
conforming the stack with a mechanical forming medium.
The forming medium may be a mechanical forming medium, such as a roll or press forming.

The method according to the present invention can also comprise
conforming the stack by hydroforming or vacuum forming with an elastic membrane.

Further, the method comprises
enclosing the stack within a forming medium 65, 72,
evacuating the forming medium 65, 72 for allowing the forming medium to stretch and conform the stack 66, 73 to the tool 61, 71.

According to the present invention, the forming medium 65, 72 used under the forming step can be an elastic vacuum bag.
The method thus relates to a method that comprises
conforming the stack with a mechanical forming medium,
or enclosing the stack within a forming medium (65, 72),
evacuating the forming medium (65, 72) for allowing the forming medium to stretch and conform the stack (66, 73) to the tool (61, 71).

As disclosed above, the forming medium may be a hydroforming or vacuum forming medium or a mechanical forming medium.

The method will now also be described with the aid of FIGS. 6 and 7, wherein hot drape forming is used. However, the invention is not limited to hot drape forming. Mechanical forming may for example be used. In FIG. 6 a forming tool 61 is shown, which is situated in a HDF apparatus 62. The apparatus 62 and tool 61 is shown in a cross section. Support walls 63, 64 are used for supporting the forming medium 65, which may be an elastic vacuum bag. The prepreg stack 66 has been transferred from a temporary support and has been arranged on to the forming tool 61. Vacuum is applied through a vacuum connection 67 and the forming medium 65 will be forced down to the prepreg stack 66, which will be conformed to the forming tool 61. This can also be seen in FIG. 7, in which the forming medium 72 has started to move down towards the tool 71 and forcing the stack 73 to conform to the tool 71. The longitudinal sides 74, 75 of the tool 71 can here be seen in FIG. 7. The outer parts of the stack are formed down to these longitudinal sides 74, 75 of the tool 71. The article formed on such a tool according to prior art technique has problems with wrinkles in those parts of the article formed on those longitudinal sides 74, 75 of the tool 71 and when the tool has a more or less complex form. This has been solved by the present invention. Further, the method is improving the article by preventing unfavourable sliding of fibres in the plies.

The evacuating step may be performed in all temperature ranges. After the forming step, an elevated temperature may be used in order to obtain a faster curing of the article. The curing may also be performed at ambient temperature.

The prepregs are in the form of resin impregnated fibres. The resin could be thermosetting resins such as epoxy, polyester, cyanate ester, vinyl ester, BMI (bismaleimide), or thermoplastics such as PPS (poly(p-phenylene sulfide), PEI (polyethylene imine), PEEK (polyetheretherketone). The fibres are for example carbon fibres, glass fibres, organic fibres and ceramic fibres.

In the method according to the present invention, the stack starts with a ply closest to the tool having the fibres substantially orthogonal to the longitudinal direction of the tool. A ply having fibres substantially orthogonal to the longitudinal direction of the tool has the ability to slide in the orthogonal direction of the tool. This is an advantage, since the mobility of the ply prevents that wrinkles are formed. The stack also ends with a ply having the fibres substantially orthogonal to the longitudinal direction of the tool. When an elastic vacuum bag is enclosing the stack and the bag stretches and conform the stack, the ply also has the mobility against the bag, which also avoids the forming of wrinkles. Further, the slip is improved by arranging substantially diagonal plies and plies having substantially the same direction as the longitudinal direction of the tool between orthogonal plies. The advantage with the mobility of the orthogonal fibre plies has solved the problem with wrinkles in composite articles according to the method according to the present invention. In addition, at least one of the plies having fibres in the diagonal direction and at least one of the plies having fibres in the longitudinal direction comprise particles, which avoids fibre sliding in those plies.

With a stack sequence according to the present invention, a both intra and inter ply sliding effect can be obtained, which is advantageous when used for making articles which will result without wrinkles. Besides, unfavourable sliding in the plies having fibres in the diagonal and the longitudinal direction is prevented. It has been found that composite articles can be formed without wrinkles formed in the articles and no thinning of the article is obtained. This is especially clear when tools having depressed and protruding parts, or tools having some small curvature, bevels, any protrusion or any depression formed in the tool are used. Radius or curve thinning is avoided at curves for example. Further, the advantage can be seen when a thicker part is formed in an article.

The present invention also relates to a composite article produced according to the method disclosed above An article according to the present invention has been able to produce without wrinkles and without any thinning by the improved stacking sequence which has been used and the addition of particles in certain plies according to the present invention.

The stack may also be laid directly on the tool. This can be made by advanced fibre placement (AFP). The method would not include the hot drape forming for conforming the stack to the tool, since the plies will conform to the tool when laid on to the tool. By this method wrinkles are also avoided in the articles formed by the method which utilizes direct laying the stack onto the tool.

The description and definition of the plies applies for both the article and the method according to the present invention.

The invention claimed is:

1. A composite article having a longitudinal direction and a transversal transverse direction, the article comprising:
   a stack of plies wherein one ply is a bottom ply and one ply is a top ply, most of the plies comprise fibers,
   a plurality of plies having fibers substantially in a direction orthogonal to the longitudinal direction of the article and plies having fibers substantially in a same direction as the longitudinal direction of the article, wherein a bottom ply and a top ply have fibers substantially in the orthogonal direction to the longitudinal direction of the article, at least one ply has the fibers substantially in a same direction as the longitudinal direction of the article, and
   at least one ply having fibers substantially diagonal to the longitudinal direction of the article, wherein the at least one ply having fibers substantially diagonal to the longitudinal direction of the article is arranged next to another ply having fibers substantially diagonal to the longitudinal direction of the article or between plies having fibers substantially orthogonal to the longitudinal direction of the article, wherein at least one of the at least one ply having fibers substantially in the longitudinal direction of the article and at least one of the at least one ply having the fibers substantially diagonal to the longitudinal direction of the article comprise particles, the particles including at least one member selected from the group of thermoplastic tougheners, nano particles, micro particles, elastic particles, elastomer particles and polymer particles, wherein the particles comprise carbon, ceramic material, organic material, or glass, and wherein at least one or more of the plies do not include particles.

2. The composite article according to claim 1, wherein the article includes a thicker region or a build-up area, wherein the article comprises at least one ply which covers only the area of the thicker region or the build-up area.

3. The composite article according to claim 1, wherein the article includes at least one curved part.

4. The composite article according to claim 3, wherein the particles are placed in the region of the curved part.

5. The composite article according to claim 1, wherein the article comprises a stack, wherein a bottom ply has fibers substantially orthogonal to the longitudinal direction of the article, a next four plies have fibers substantially diagonal to the longitudinal direction of the article, a next ply has fibers substantially orthogonal to the longitudinal direction of the article, a next four plies have fibers in substantially a same direction as the longitudinal direction of the article, a next ply has fibers substantially orthogonal to the longitudinal direction of the article, a four next plies have fibers substantially diagonal to the longitudinal direction of the article, the next ply has the fibers substantially orthogonal to the longitudinal direction of the article.

6. The composite article according to claim 5, wherein the nano particles are selected from the group of nano tubes, nano double wall tubes, nano multi wall tubes, nano fibers, nano double wall fibers, nano filaments, nano double wall filaments and nano wires or a combination of them and the micro particles are selected from the group of micro tubes, micro double wall tubes, micro multi wall tubes, micro fibers, micro double wall fibers, micro filaments, micro double wall filaments and micro wires or a combination of them.

7. The composite article according to claim 1, wherein at least one ply having fibers substantially in the orthogonal direction does not comprise particles.

8. The composite article according to claim 1, wherein at least one ply having fibers substantially in the orthogonal direction comprises particles.

9. A method of forming an article on a tool, the tool having one longitudinal direction L and one transverse direction T, the method comprising:
   arranging a stack of plies, wherein most of or all of the plies comprise fibers, wherein the stack comprises a plurality of plies having fibers substantially in a direction orthogonal to the longitudinal direction of the tool and plies having fibers substantially in a same direction as the longitudinal direction of the tool, so that when positioned on the tool the ply arranged closest to the tool and the ply arranged furthest away from the tool have the fibers substantially in the orthogonal direction to the longitudinal direction of the tool, and arranging at least one ply having the fibers substantially in the same direction as the longitudinal direction of the tool between plies having fibers substantially orthogonal to the longitudinal direction of the tool,
   arranging at least one ply having fibers substantially diagonal to the longitudinal direction of the tool, wherein the at least one ply having fibers substantially diagonal to the longitudinal direction of the tool is arranged next to another ply having fibers substantially diagonal to the longitudinal direction of the tool or between plies having fibers substantially orthogonal to the longitudinal direction of the tool, wherein at least one of the at least one ply having fibers substantially in the longitudinal direction of the tool and at least one of the at least one ply having the fibers substantially diagonal to the longitudinal direction of the tool comprise particles, the particles including at least one member selected from the group of thermoplastic tougheners, nano particles, micro particles, elastic particles, elastomer particles and polymer particles, wherein the particles comprise carbon, ceramic material, organic material, or glass, and wherein at least one or more of the plies do not include particles,
   conforming the stack to the tool with a forming medium; and
   removing the article from the tool.

10. The method according to claim 9, wherein the tool has at least one depressed part and at least one protruding part, which protruding part is protruding in relation to the depressed part of the tool.

11. The method according to claim 10, wherein the plies are arranged so that at least one of the plies covers at least a part of the at least one depressed part and not the at least one protruding part and the other plies cover both the at least one depressed parts and the at least one protruding parts.

12. The method according to claim 9, further comprising:
   arranging the stack so that when positioned on the tool a ply arranged closest to the tool has fibers substantially orthogonal to the longitudinal direction of the tool, a next four plies have fibers substantially diagonal to the longitudinal direction of the tool, a next ply has fibers substantially orthogonal to the longitudinal direction of the tool, a next four plies have fibers in substantially the same direction as the longitudinal direction of the tool, a next ply has the fibers substantially orthogonal to the longitudinal direction of the tool, a four next plies have fibers substantially diagonal to the longitudinal direction of the tool, and a next ply has fibers substantially orthogonal to the longitudinal direction of the tool.

13. The method according to claim 9, wherein the tool comprises at least one curved part.

14. The method according to claim 13, wherein the plies comprising particles are arranged so that the particles are placed in the area of the curved part.

15. The method according to claim 9, wherein the nano particles are selected from the group of nano tubes, nano double wall tubes, nano multi wall tubes, nano fibres, nano double wall fibres, nano filaments, nano double wall filaments and nano wires or a combination of them and the micro particles are selected from the group of micro tubes, micro double wall tubes, micro multi wall tubes, micro fibres, micro double wall fibres, micro filaments, micro double wall filaments and micro wires or a combination of them.

* * * * *